United States Patent
Muehlmann et al.

(10) Patent No.: US 10,574,281 B1
(45) Date of Patent: Feb. 25, 2020

(54) BASEBAND AUTOMATIC GAIN CONTROL FOR ON-OFF KEYING PROTOCOLS WITHOUT A PREAMBLE

(71) Applicant: NXP B.V., Eindhoven (NL)

(72) Inventors: Ulrich Andreas Muehlmann, Graz (AT); Radha Srinivasan, Irvine, CA (US); Stefan Mendel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/236,272

(22) Filed: Dec. 28, 2018

(51) Int. Cl.
| | |
|---|---|
| *H04B 1/06* | (2006.01) |
| *H04B 1/12* | (2006.01) |
| *H04B 5/02* | (2006.01) |
| *H04B 1/16* | (2006.01) |
| *H04B 5/00* | (2006.01) |

(52) U.S. Cl.
CPC .............. *H04B 1/123* (2013.01); *H04B 1/16* (2013.01); *H04B 5/02* (2013.01); *H04B 5/0093* (2013.01)

(58) Field of Classification Search
CPC . H04B 1/12; H04B 1/16; H04B 1/123; H04B 1/1607; H04B 1/1615; H04B 5/02; H04B 5/0056; H04B 17/318; H04W 52/245; H04W 72/085; H03G 3/20; H04L 27/08
See application file for complete search history.

(56) References Cited

U.S. PATENT DOCUMENTS

| | | | |
|---|---|---|---|
| 10,181,916 B1* | 1/2019 | Modi | H04B 17/318 |
| 2009/0237218 A1* | 9/2009 | Kim | H04B 5/02 340/10.3 |
| 2012/0263262 A1* | 10/2012 | Etemadi | H03G 3/20 375/345 |
| 2018/0013604 A1* | 1/2018 | Wenzel | H04L 1/20 |
| 2019/0190554 A1* | 6/2019 | Srinivasan | H04B 1/12 |

* cited by examiner

*Primary Examiner* — Thanh C Le
(74) *Attorney, Agent, or Firm* — Shuqian Yan (57) ABSTRACT

A device includes a near field communication (NFC) module for generating an electromagnetic carrier signal and modulating the carrier signal according to data to be transmitted, and an antenna coupled to and driven by the NFC module with the modulated carrier signal. The device includes an analog front end coupled between the NFC module and the antenna. The device further includes a digital gain control (DGC) block for controlling gains in a first and second baseband amplifiers (BBAs). The DGC block includes a first clipping detector for correlating in-phase input signals with a subcarrier pattern and a second clipping detector for correlating quadrature input signals with the subcarrier pattern, and further includes a signal energy correction block adapted to output a number of correction ticks for a numerically controlled oscillator (NCO) based on a number of gain updates performed for the first or the second BBAs.

18 Claims, 5 Drawing Sheets

BASEBAND AUTOMATIC GAIN CONTROL FOR ON-OFF KEYING PROTOCOLS WITHOUT A PREAMBLE

The present disclosure generally relates to contactless communication, and more particularly to near field communication (NFC).

Near field communication (NFC) is a form of contactless communication between devices like smartphones or tablets. NFC devices can operate in three different modes based on the ISO/IEC 18092, NFC IP-1 and ISO/IEC 14443 contactless smart card standards. In the read/write mode, an NFC device can read or write data to any of the supported tag types in a standard NFC data format. In the Peer-to-Peer (P2P) mode, two NFC devices can exchange data such as virtual business cards or digital photos. You can also share Bluetooth or Wi-Fi link set up parameters to initiate a Bluetooth or Wi-Fi link in the P2P mode. P2P mode is standardized in the ISO/IEC 18092 standard. In the card emulation mode, NFC devices can act as a virtual version of any plastic card that conforms to the core international standard for contactless smart cards, ISO/IEC 14443 AB (also known as ISO 14443 Type A and Type B). NFC devices can also provide support for Sony's FeliCa contactless card technology, which is widely used in Japan for both contactless card payments and for mobile payments.

Figure 1:
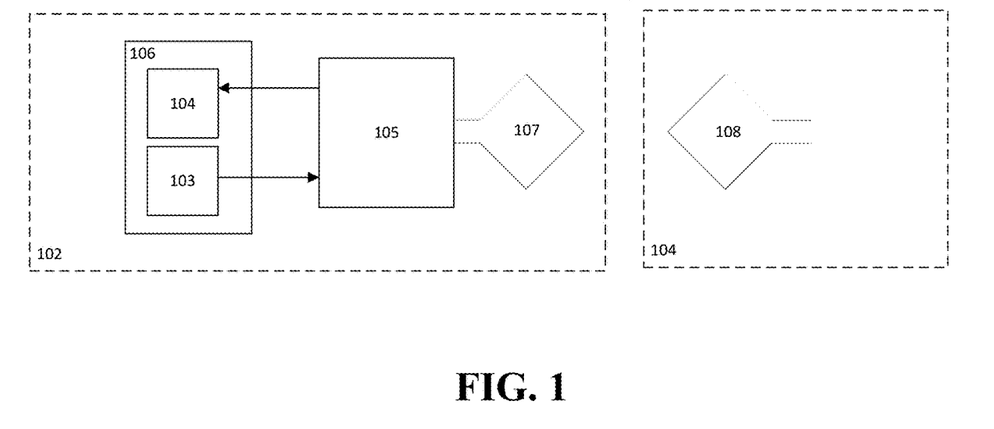
FIG. 1 is an example inductively coupled communication system.

FIG. 1 depicts an inductively coupled communication system. Communication system 100 may include a first communication device 102 and a second communication device 104. Communication device 102 and communication device 104 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 102 may generate an electromagnetic field to which the second device 104 may be coupled. For example, in the case of NFC, the direction for the data flow may be characterized by having the first device 102 (also referred to as a polling device, proximity coupling device (PCD), reader or initiator) provide the electromagnetic field. The second device 104 (also referred to as a listener, listening device, proximity integrated circuit card (PICC), card, tag or target) may communicate with the first device 102 by generating modulation content.

As depicted in FIG. 1, the first device 102 may include a transmitter 103 and a receiver 104. The transmitter and receiver may be part of an NFC module 106, such as type no. PN5xx manufactured by NXP Semiconductors. The first device 102 may further include an analog front-end module 105 and an antenna 107. The second device 104 may include an antenna 108, which is inductively coupled to the antenna 107.

From an NFC system perspective, the responses from a card may be of active or passive type and the required operational distance may range from zero to several centimeters. The resultant dynamic range demand on the NFC reader receiver may not be met by the state-of-the-art NFC reader ICs. For example, this could be limited by the resolution of the integrated analog to digital converter (ADC). While the limitation may be overcome by the use of an additional automated gain control (AGC) that brings the ADC input range into balance, classical AGC regulation loops may still fail for on-off keying protocols without a preamble (OOKWP).

SUMMARY

A device includes an NFC module being adapted to generate an electromagnetic carrier signal and to modulate the carrier signal according to data to be transmitted, an antenna coupled to and driven by said NFC module with the modulated carrier signal, and a receiver analog front end (AFE) coupled between said NFC module and said antenna circuit. The receiver analog front end includes a first baseband amplifier (BBA) for amplifying in-phase signals and a second baseband amplifier (BBA) for amplifying quadrature signals. The device includes a first analog to digital converter (ADC) coupled to said first BBA for converting in-phase signals to digital signals and a second ADC coupled to said second BBA for converting quadrature signals to digital signals. The device further includes a digital gain control (DGC) block for controlling gains in a first and second baseband amplifiers (BBAs). The DGC block includes a signal energy correction block adapted to output a number of correction ticks for a numerically controlled oscillator (NCO) based on a number of gain updates performed for the first or the second BBAs.

In one embodiment, the DGC block includes a first clipping detector adapted to correlate in-phase input signals with a subcarrier pattern, and a second clipping detector adapted to correlate quadrature input signals with the subcarrier pattern.

In one embodiment, the first clipping detector includes a first clipping indicator adapted to compare an input signal from the first ADC with a threshold and output a "1" if the ADC input signal is greater than the threshold, "−1" if the ADC input signal is less than the threshold and "0" otherwise.

In one embodiment, the first clipping detector includes a first clipping correlator adapted to correlate the output from the first clipping indicator to the subcarrier pattern and generate a first correlator output, wherein said first correlator output is provided to a finite state machine (FSM).

In one embodiment, the second clipping detector includes a second clipping indicator adapted to compare an input signal from the second ADC with a threshold and output a "1" if the ADC input signal is greater than the threshold, "−1" if the ADC input signal is less than the threshold and "0" otherwise.

In one embodiment, the second clipping detector includes a second clipping correlator adapted to correlate the output from the second clipping indicator to the subcarrier pattern and generate a second correlator output, wherein said second correlator output is provided to a finite state machine (FSM).

In one embodiment, the DGC block includes a first water level monitor adapted to generate a first water level update based on an input signal from the first ADC, and a second water level monitor adapted to generate a second water level update based on an input signal from the second ADC. Said first water level update and second water level update are provided to the finite state machine (FSM).

In one embodiment, said FSM is adapted to perform a linear gain update search for the first BBA based on the first correlator output. Said FSM detects a clipping if said first correlator output is greater than a clipping threshold.

In one embodiment, said FSM is adapted to perform a linear gain update search for the first BBA in response to a first water level update.

In one embodiment, said FSM is adapted to perform a linear gain update search for the second BBA based on the second correlator output.

In one embodiment, said FSM is adapted to perform a linear gain update search for the second BBA in response to a second water level update.

In one embodiment, said DGC includes a gain update manager for adjusting gains of the first and second BBAs.

In one embodiment, said gain update manager adjusting the gains of the first and second BBAs includes updating the gains for the first and second BBAs with a same value.

In one embodiment, said gain update manager adjusting the gains of the first and second BBAs includes updating the gains for the first and second BBAs with a different gain value for each BBA.

In one embodiment, the number of correction ticks at the NCO is a function of the number of gain updates performed for the first BBA during a start of frame (SOF) gain adjustment, a filter length of a subcarrier matched filter, and a filter length of a synchronizer matched filter.

In one embodiment, the signal energy correction block determines the number of correction ticks at the numerically controlled oscillator (NCO) according to a transfer function.

In one embodiment, said subcarrier pattern is predetermined.

A device includes an NFC module being adapted to generate an electromagnetic carrier signal and to modulate the carrier signal according to data to be transmitted, an antenna coupled to and driven by said NFC module with the modulated carrier signal, and a receiver analog front end (AFE) coupled between said NFC module and said antenna circuit. The receiver analog front end includes a first baseband amplifier (BBA) for amplifying in-phase signals and a second baseband amplifier (BBA) for amplifying quadrature signals. The device includes a first analog to digital converter (ADC) coupled to said first BBA for converting in-phase signals to digital signals and a second ADC coupled to said second BBA for converting quadrature signals to digital signals. The device further includes a digital gain control (DGC) block for controlling gains in a first and second baseband amplifiers (BBAs). The DGC block includes a first clipping detector for correlating in-phase input signals with a subcarrier pattern and a second clipping detector for correlating quadrature input signals with the subcarrier pattern, and further includes a signal energy correction block adapted to output a number of correction ticks for a numerically controlled oscillator (NCO) based on a number of gain updates performed for the first or the second BBAs.

The above discussion is not intended to represent every example embodiment or every implementation within the scope of the current or future Claim sets.

Various example embodiments may be more completely understood in consideration of the following Detailed Description in connection with the accompanying Drawings.

BRIEF DESCRIPTION OF THE DRAWINGS

FIG. 7 illustrates the OOKWP SOF Synchronization mismatch enforced by the DGC control on clipped input signals. Specifically.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 2:
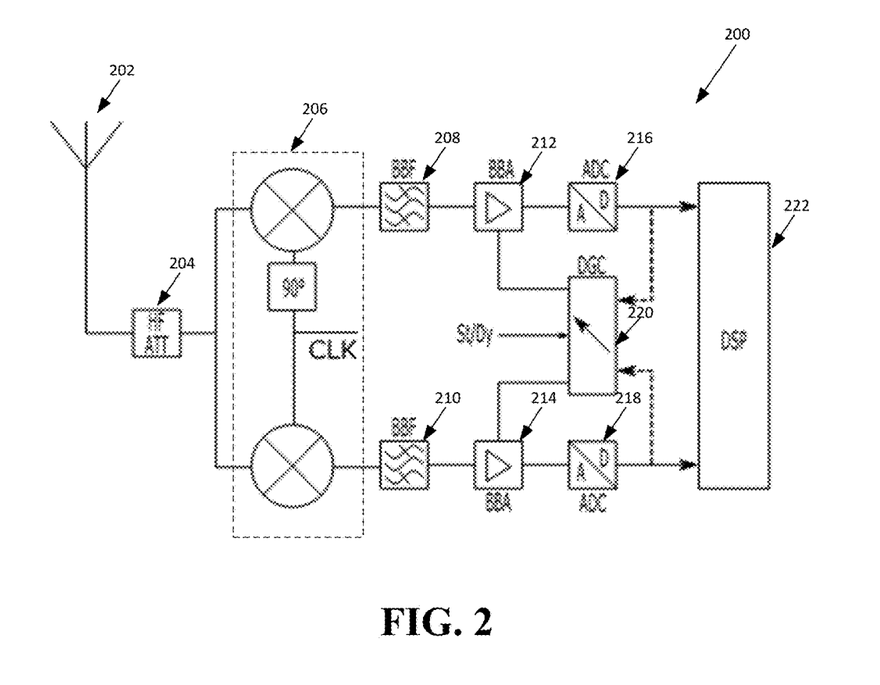
FIG. 2 is a schematic diagram illustrating a gain control configuration implemented for an NFC device.

FIG. 2 is a schematic diagram illustrating a gain control configuration implemented for an NFC device.

As depicted in FIG. 2, the NFC receiver analog front end (AFE) includes a HF-attenuator 204 for holding the antenna input signal in range. A subsequent direct conversion demodulator 206 is used to bring the card modulation back to baseband. After low-pass filtering and image-rejection, the IQ (in-phase and quadrature) signals are amplified by base band amplifiers (BBA) 212 and 214 and converted to the digital domain by dedicated analog to digital converters (ADC) 216 and 218. The outputs of the ADCs are continuously monitored, and gain updates for the BBAs are performed via a digital gain control (DGC) block 220. Here, the dotted lines indicate closed loop actual digital gain control during reception.

As depicted in FIG. 2, the schematic may also include a digital signal processor (DSP) 222 for performing various functions for the NFC device. Furthermore, while it is not depicted in FIG. 2, a gain compensation block may be coupled between the respective ADC (216, 218) and the DSP as will be explained in detail with reference to FIG. 7.

The above-described gain control configuration makes it possible to follow the signal variation of a "moving card" smoothly. But for on-off keying protocols without a preamble (OOKWP) scenarios we may be faced with a dilemma of performing start-of-frame (SOF) synchronization and "blind" gain control simultaneously. "Blind" refers to adopting to a signal level that is not known a-priori and there exists no portion of the received signal that can be waived on running the signal gain adoption.

Static gain setting (depicted in FIG. 2 as "St") refers to no gain regulation being performed during reception. The gain setting is determined by off-line reference measurements at the system level. On the other hand, pseudo dynamic gain control (depicted in FIG. 2 as "Dy") refers to no actual continuous regulation during reception. Hence, some on-line reference measurements are drawn, e.g., from the transmitter current sensor, or from pervious receptions giving indication of the received signal strength (RSSI), to determine the actual coupling status: "weak", "moderate", or "strong". Based on this classification, the BBAs are configured. In order to make such configurations stable, sub-optimal switching hysteresis may be introduced.

On-off keying (OOK) is defined to be a burst of subcarrier cycles in the modulated on-phase and blank in the off-phase. On/off phases are normally of 50% duty-cycle. A subcarrier cycle is a natural fraction of the carrier frequency period. The carrier frequency is 13.56 MHz for NFC and RFID systems. The natural fraction is 1/16, 1/32, or any other of ½^n. The number of subcarrier cycles forming one burst may be 2, 4, 8, or any other value that fits 2^n.

Figure 3:
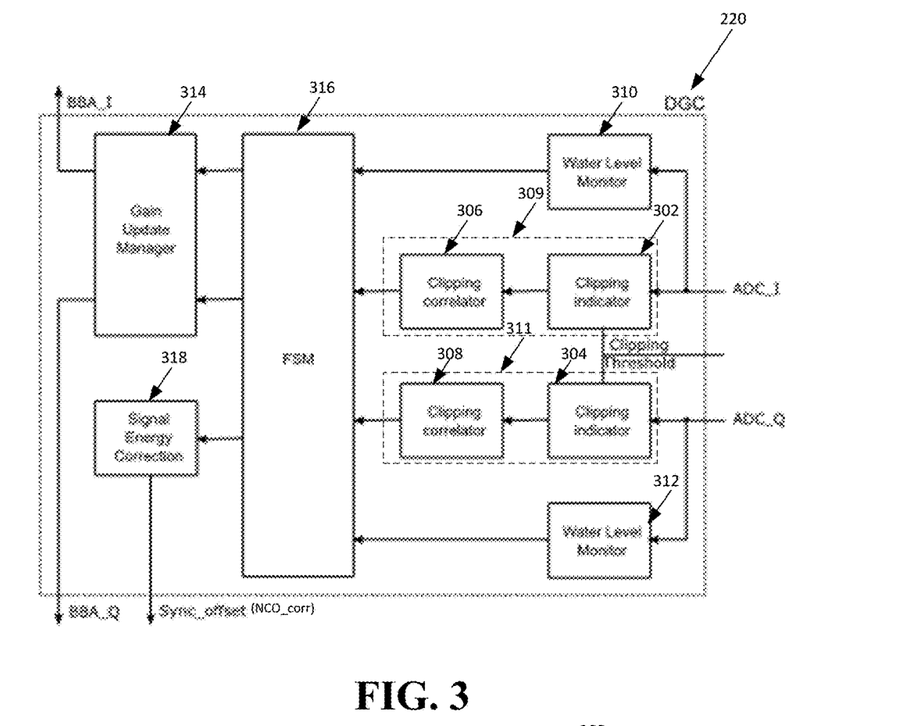
FIG. 3 illustrates a circuit diagram of the digital gain control (DGC) block of FIG. 2.

FIG. 3 illustrates a circuit diagram of the digital gain control (DGC) block of FIG. 2.

As shown in FIG. 3, digital gain control (DGC) block 220 includes two clipping indicators 302 and 304, two clipping correlators 306 and 308, two water level monitors 310 and 312, a gain update manager 314, a finite state machine (FSM) 316, and an OOK signal energy correction block 318. In one embodiment, a clipping detector 309 for the I-channel includes clipping indicator 302 and clipping correlator 306, and a clipping detector 311 for the Q-channel includes clipping indicator 304 and clipping correlator 308. In one embodiment, clipping detector 309 and clipping detector 311 are both operating according to the same mechanism. In one embodiment, water level monitors 310 and 312 are operating according to the same mechanism.

In operation, the DGC receives input data (ADC_I, ADC_Q) from the ADCs and generates output data (BBA_I, BBA_Q) to control the gain in the respective BBAs. In addition, the OOK signal energy correction block generates a Sync_offset (NCO_corr) signal for correcting the SOF synchronization delay error caused by the gain shift of moving average signal energy compensation.

There are two basic constraints for the DGC block, namely the number of BBA stages involved in the gain update search mechanism and the tolerable gain update latency. In one embodiment, the number of BBA gain stages is selected to fit the OOK modulation scheme. For example, an OOK burst normally consists of 4 subcarrier periods, and the maximum number of BBA gain stages is 5, this means a maximum of 4 BBA gain stage updates are tolerable if a linear search is applied. If an OOK burst consist of less than the number of different BBA gain stages, then a binary search is applied.

In one embodiment, the gain update latency is selected to be one subcarrier cycle. This gives a good trade-off between update speed and clipping detection robustness. Clipping is generally indicated when the input signal hits a programmable threshold. In one embodiment, clipping is detected on both channels (in-phase and quadrature) simultaneously and gain updates are controlled by a dedicated gain update manager.

The following describes the details of each block of the DGC.

The Clipping Detector

Figure 4:
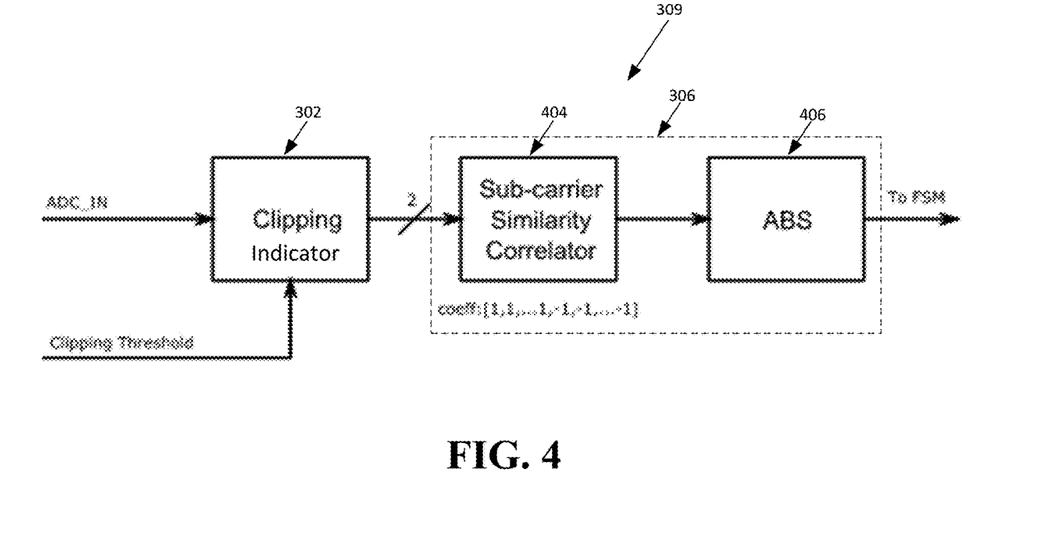
FIG. 4 shows the clipping detector for the I-channel (i.e., clipping detector 309 of FIG. 3).

FIG. 4 shows the clipping detector for the I-channel (i.e., clipping detector 309 of FIG. 3).

As mentioned previously, clipping is generally indicated when the input signal hits a programmable threshold. The BBA gain is reduced when clipping is detected. In one embodiment, clipping can be detected by first comparing the ADC data (ADC_IN) to a threshold (Clipping Threshold (CT)) and then correlating the output of the clipping indicator with a sub-carrier pattern. In one embodiment, the sub-carrier pattern is pre-determined.

As depicted in FIG. 4, the clipping indicator 302 outputs +1 if the ADC_IN>CT, −1 if the ADC_IN<−CT and 0 otherwise. In one embodiment, clipping correlator 306 includes a sub-carrier similarity correlator 404 and an ABS block 406 which outputs the absolute value of the input. The output of clipping indicator 302 is correlated with a sub-carrier pattern via sub-carrier similarity correlator 404. Subsequently, the output of the clipping correlator 306 is provided to FSM as indicated in FIG. 4. Clipping is detected when the output of the clipping detector of either the I or the Q channel is greater than a threshold (this will be described with reference to FIG. 6). In one embodiment, 2N is the number of samples of one sub-carrier cycle and the threshold is equivalent to N.

The following is an example illustrating the operation of the clipping detector for an input of 16 SOF samples to the sub-carrier similarity correlator 404. In this example, the absolute value of the output of sub-carrier similarity correlator 404 of the I channel equals 8, which is greater than a threshold. As such, clipping is detected on the positive side. It should be noted that clipping or not is determined by the FSM, which will be described with reference to FIG. 6.

| Correlator coefficient | 1 | 1 | 1 | 1 | 1 | 1 | 1 | 1 | −1 | −1 | −1 | −1 | −1 | −1 | −1 | −1 |
|---|---|---|---|---|---|---|---|---|---|---|---|---|---|---|---|---|
| Correlator input | 1 | 1 | 1 | 1 | 1 | 1 | 1 | 1 | 0 | 0 | 0 | 0 | 0 | 0 | 0 | 0 |
| Correlator output | 1 | 1 | 1 | 1 | 1 | 1 | 1 | 1 | 0 | 0 | 0 | 0 | 0 | 0 | 0 | 0 |

Here is another example illustrating the operation of the clipping detector for an input of 16 SOF samples to the correlator 404. In this example, the absolute value of the output of sub-carrier similarity correlator 404 of the I channel equals 16, which is also greater than a threshold. As such, clipping is detected on both the positive side and negative side.

| Correlator coefficient | 1 | 1 | 1 | 1 | 1 | 1 | 1 | 1 | −1 | −1 | −1 | −1 | −1 | −1 | −1 | −1 |
|---|---|---|---|---|---|---|---|---|---|---|---|---|---|---|---|---|
| Correlator input | 1 | 1 | 1 | 1 | 1 | 1 | 1 | 1 | −1 | −1 | −1 | −1 | −1 | −1 | −1 | −1 |
| Correlator output | 1 | 1 | 1 | 1 | 1 | 1 | 1 | 1 | 1 | 1 | 1 | 1 | 1 | 1 | 1 | 1 |

Here is yet another example illustrating the operation of the clipping detector for an input of 16 SOF samples to the correlator 404. In this example, the absolute value of the output of sub-carrier similarity correlator 404 of the I channel equals 0, which is not greater than a threshold. As such, clipping is not detected.

| Correlator coefficient | 1 | 1 | 1 | 1 | 1 | 1 | 1 | 1 | −1 | −1 | −1 | −1 | −1 | −1 | −1 | −1 |
|---|---|---|---|---|---|---|---|---|---|---|---|---|---|---|---|---|
| Correlator input | 1 | 1 | 1 | 1 | 1 | 1 | 1 | 1 | 1 | 1 | 1 | 1 | 1 | 1 | 1 | 1 |
| Correlator output | 1 | 1 | 1 | 1 | 1 | 1 | 1 | 1 | −1 | −1 | −1 | −1 | −1 | −1 | −1 | −1 |

Thus, the clipping detector makes use of the target subcarrier frequency by matching a correlator to the output of the clipping indicator.

The Water Level Monitor

Figure 5:
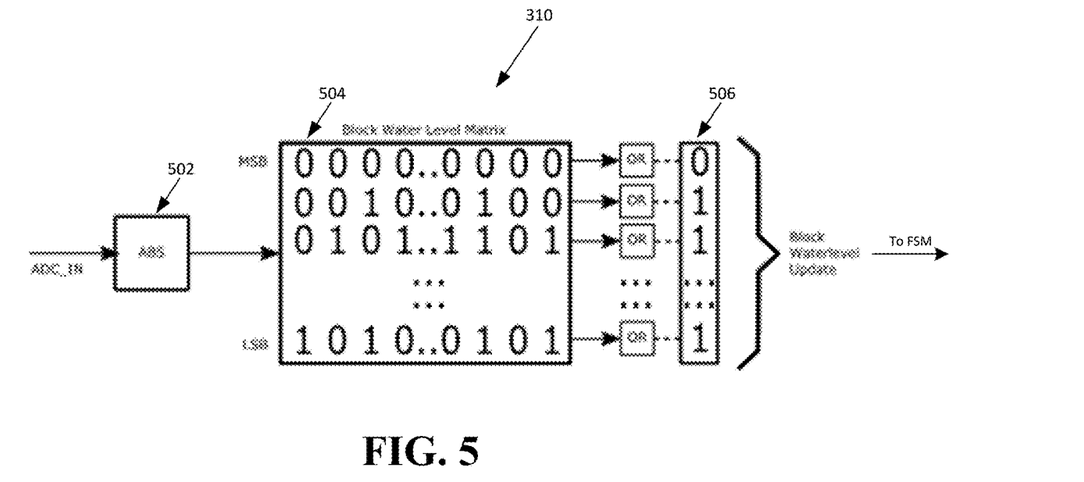
FIG. 5 shows the water level monitor for the I-channel (i.e., water level monitor 310 of FIG. 3).

FIG. 5 shows the water level monitor for the I-channel (i.e., water level monitor 310 of FIG. 3).

As depicted in FIG. 5, the absolute value of the ADC input data is calculated using an ABS block 502 which outputs the absolute value of the input. Then the individual samples are shifted to a block water level matrix 504. The block length (water_level_cycle) is a natural multiple of the samples per subcarrier cycle (SPS). For example, the block length (water_level_cycle) equals 16 when there are 16 samples in one sub-carrier cycle. Subsequently, the contents of all the rows of the matrix are digitally linked by an "OR" function. The output column 506 forms the block water level update, which is output to the FSM as indicated in FIG. 5.

The following is an example illustrating the operation of the water level monitor for an input of 16 samples. First, let's assume that the input signal amplitude for each sample equals +250 and −250. Thus, the absolute value of each sample amplitude equals 250.

| Input signal amplitude per sample | 250 | 250 | 250 | 250 | 250 | 250 | 250 | 250 | −250 | −250 | −250 | −250 | −250 | −250 | −250 | −250 |
|---|---|---|---|---|---|---|---|---|---|---|---|---|---|---|---|---|
| Absolute value of the above input signal | 250 | 250 | 250 | 250 | 250 | 250 | 250 | 250 | 250 | 250 | 250 | 250 | 250 | 250 | 250 | 250 |

Next, each individual sample is shifted to block water level matrix 504, which yields the following matrix in binary representation. The output column 506 (the last column of the matrix below) forms the block water level update. In this example, the numerical value of the output column equals 250, which is output to the FSM. The FSM determined if a clipping is detected based on this value (this will be described with reference to FIG. 6).

| MSB | 0 | 0 | 0 | 0 | 0 | 0 | 0 | 0 | 0 | 0 0 0 0 0 0 0 |
|---|---|---|---|---|---|---|---|---|---|---|
|  | 0 | 0 | 0 | 0 | 0 | 0 | 0 | 0 | 0 | 0 0 0 0 0 0 0 |
|  | 0 | 0 | 0 | 0 | 0 | 0 | 0 | 0 | 0 | 0 0 0 0 0 0 0 |
|  | 1 | 1 | 1 | 1 | 1 | 1 | 1 | 1 | 1 | 1 1 1 1 1 1 1 |
|  | 1 | 1 | 1 | 1 | 1 | 1 | 1 | 1 | 1 | 1 1 1 1 1 1 1 |
|  | 1 | 1 | 1 | 1 | 1 | 1 | 1 | 1 | 1 | 1 1 1 1 1 1 1 |
|  | 1 | 1 | 1 | 1 | 1 | 1 | 1 | 1 | 1 | 1 1 1 1 1 1 1 |
|  | 1 | 1 | 1 | 1 | 1 | 1 | 1 | 1 | 1 | 1 1 1 1 1 1 1 |
|  | 0 | 0 | 0 | 0 | 0 | 0 | 0 | 0 | 0 | 0 0 0 0 0 0 0 |
|  | 1 | 1 | 1 | 1 | 1 | 1 | 1 | 1 | 1 | 1 1 1 1 1 1 1 |
| LSB | 0 | 0 | 0 | 0 | 0 | 0 | 0 | 0 | 0 | 0 0 0 0 0 0 0 |

Thus, for the water level monitor, clipping is detected if the input signal is above a threshold, whereas for the clipping correlator, clipping may be detected depending on whether the input signal pattern matches a subcarrier pattern.

The water level monitors (310, 312) may be controlled to be turned on or off. In one embodiment, the water level monitors (310, 312) are turned off. In another embodiment, the water level monitors (310, 312) are turned on.

The FSM

Figure 6:
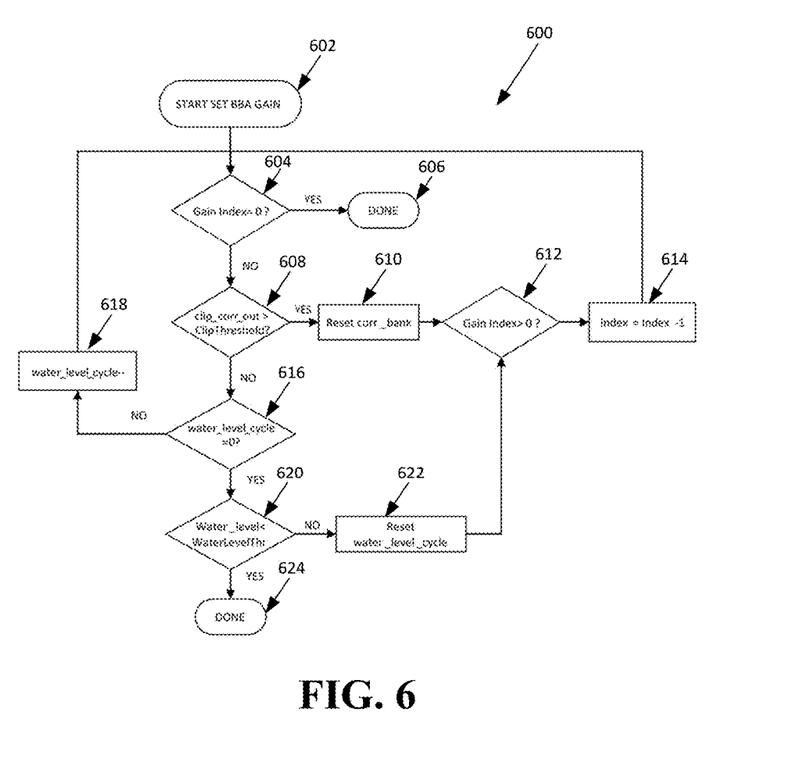
FIG. 6 is a flow diagram illustrating a method of linear gain update search performed by the FSM of FIG. 3.

FIG. 6 is a flow diagram illustrating a method of linear gain update search performed by the FSM of FIG. 3. It is noted that the gain update search as illustrated in FIG. 6 is performed with respect to the in-phase (I) path. The same search mechanism may also be performed for the quadrature (Q) path.

Method 600 starts at 602. The initial gain settings may be programmable by the software and/or firmware. In one embodiment, the BBAs are initially set to a maximum gain in order to operate the receiver at high sensitivity. In one embodiment, the water_level_cycle is set to an arbitrary number that is larger than zero, e.g., water_level_cycle=16.

At step 602, method 600 checks the value of gain index. If the gain index is 0, then no gain regulation is needed, method 600 stops at step 606. Otherwise, method 600 proceeds to step 608.

At step 608, the output of the respective clipping detector is compared to the clipping threshold. If it is greater than the clipping threshold, then clipping is detected and as a result the gain for the corresponding BBA is reduced. Then method 600 resets the correlator at step 610 (e.g., loading new input samples) and also checks if the gain index is greater than zero at step 612, and subsequently decrement the gain index value by 1 at step 614. Method 600 then loops back to step 604. However, if the output of the respective clipping detector is less than the clipping threshold (e.g., no signal saturation), method 600 will check the water level as described below.

At step 616, method 600 checks the value of water_level_cycle. For example, assume the water level cycle is initially set to 16, which means that the water level is checked once for every 16 cycles. Therefore, as long as the value of water_level_cycle is not zero, method 600 will decrement the value by 1 according to step 618. However, if the value of water_level_cycle reaches zero, method 600 proceeds to step 620.

At step 620, method 600 compares the value of water level update (the output of the water level monitor) with a water level threshold (WaterLevelThr). If the value of water level update is not less than the water level threshold, then clipping is detected and as a result the gain for the corresponding BBA is reduced. Then method 600 resets the value of water_level_cycle at step 622. Otherwise, the regulation stops if the water level is falling below the water level threshold at step 624.

The Gain Update Manager

The gain update manager 314 of FIG. 3 regulates the gain adjustment for the BBAs. In one embodiment, the BBAs are commonly updated with the same gain value of that channel that clips the most. In an alternative embodiment, the BBAs are individually updated. In the latter case, the applied gains may be different depending on the individual clipping status for each channel.

The Signal Energy Correction

As mentioned earlier, a gain compensation block may be coupled between the respective ADC (216, 218) and the DSP to compensate for the gain drop in the BBAs. The ADC output is digitally compensated for BBA gain so that the signal level to the demodulator (or the DSP) remains the same. Let's assume that the BBA gain steps are multiples of 6 dB, and the gain_shift is zero for the maximum value of the BBA gain and the gain_shift is incremented by 1 for every 6 dB drop in the BBA gain. Table 1 below shows the values of gain_shift for a design with BBA gain ranging from 0 to 18 dB. In one embodiment, the gain_shift controls the number of bits to left-shift the ADC output data.

TABLE 1

| BBA gain (dB) | Gain_shift |
|---|---|
| 0 | 3 |
| 6 | 2 |
| 12 | 1 |
| 18 | 0 |

Figure 7A:
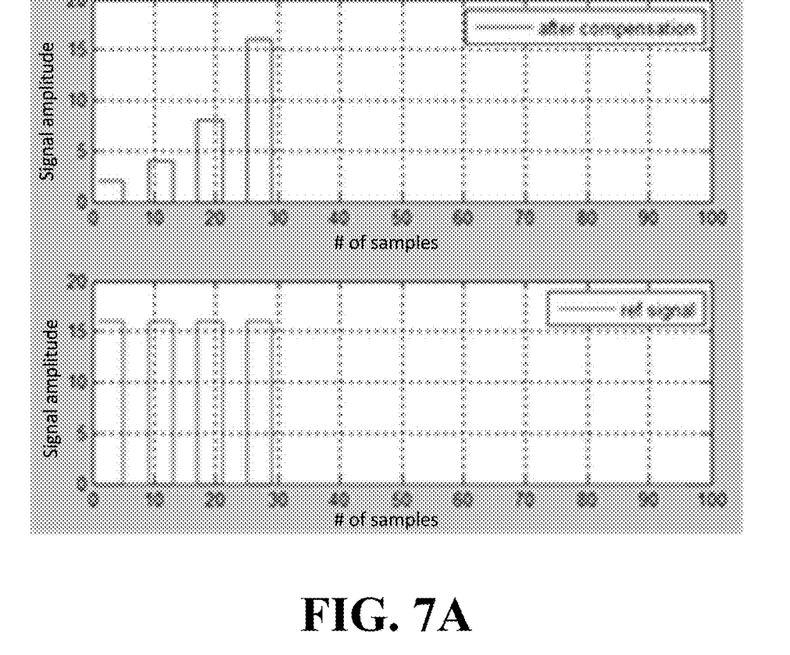
FIG. 7A illustrates the difference between signals after gain compensation and the reference signal.
Figure 7B:
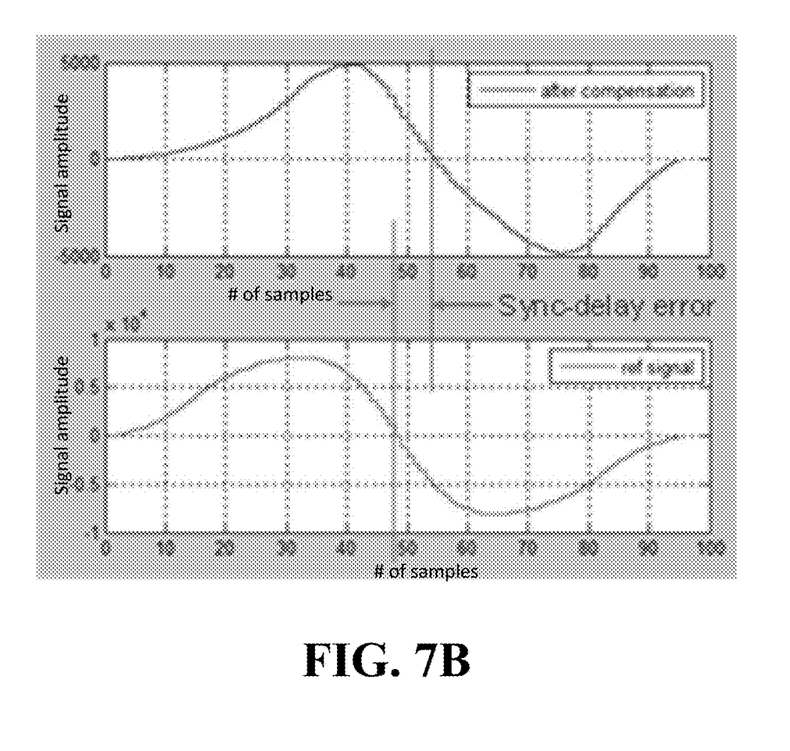
FIG. 7B illustrates the difference between the actual (after gain compensation) and the reference bit grid synchronization instant.

In case of ADC data clipping, this gain compensation is ill-posed because the actual signal lies somewhere above the ADC resolution range. The resultant gain compensation of the DGC is illustrated in FIG. 7A top diagram. When this signal is passed to a matched filter for average signal energy detection then the correlation maximum will change in reference to the reference signal shown FIG. 7A bottom diagram. The difference between the actual (after gain compensation) and the reference bit grid synchronization instant is illustrated in FIG. 7B.

The above-described gain compensation may result in a start of frame (SOF) synchronization offset of OOKWP and degrade the reception performance. FIG. 7B shows a synchronization delay error due to the gain compensation.

This negative effect of gain compensation of the DGC may be compensated by adjusting a numerically controlled oscillator (NCO) of the bit-grid counter accordingly. In one embodiment, the number of correction ticks at the NCO (NCO_corr) is a function of the number of gain correction steps during SOF gain adjustment known by the FSM, the filter length of the subcarrier matched filter, and the filter length of the synchronizer matched filter.

Figure 8:
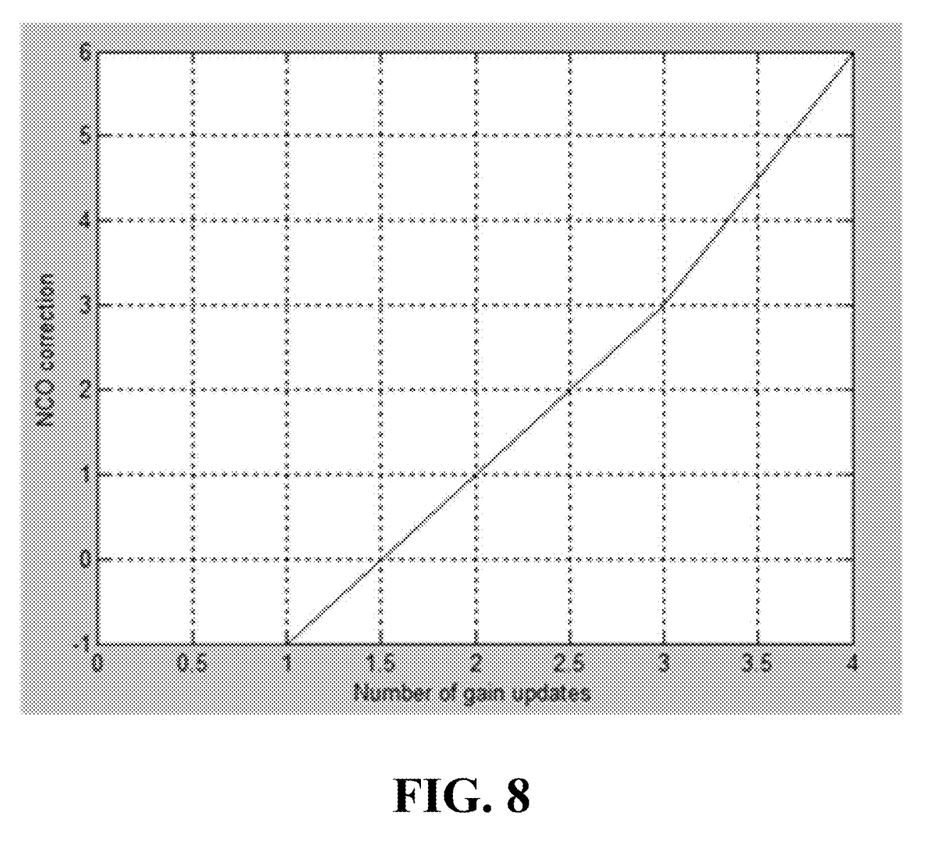
FIG. 8 is a graphical representation of the relationship between the number of gain updates and the required NCO delay correction steps.

FIG. 8 is a transfer function illustrating the relationship between the number of gain updates known by the FSM and the required NCO delay correction. Below is a mathematical representation of this function.

$$\text{NCO\_corr} = \left\lfloor (\text{N\_GU} - 1)\left(\frac{SPS}{4} + \frac{\text{LEN\_SCMF}}{16} - 1\right)\right\rfloor,$$

Where N_GU equals to the number of gain updates during SOF gain adjustment known by the FSM, SPS represses the number of samples per subcarrier, and LEN_SCMF denotes the length of the OOK burst MF (matched filter). It should be noted that only positive results are considered for NCO_corr.

Referring back to FIG. 3, the signal energy correction block 318 is configured to output the required NCO delay correction (Sync_offset or NCO_corr) in response to the number of gain updates from the FSM. As a result, the start of frame (SOF) synchronization offset of OOKWP (sync-delay error) is corrected. Thus, the gain compensation of DGC will not cause a negative effect on the SOF synchronization.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A device comprising:
   a near field communication (NFC) module being adapted to generate an electromagnetic carrier signal and to modulate the carrier signal according to data to be transmitted, said NFC module including a transmitter and a receiver;
   an antenna coupled to said NFC module and driven by said NFC module with the modulated carrier signal;
   a receiver analog front end (AFE) coupled between said NFC module and said antenna circuit, said receiver analog front end including a first baseband amplifier (BBA) for amplifying in-phase signals and a second baseband amplifier (BBA) for amplifying quadrature signals;
   a first analog to digital converter (ADC) coupled to said first BBA for converting in-phase signals to digital signals;
   a second ADC coupled to said second BBA for converting quadrature signals to digital signals; and
   a digital gain control (DGC) block for controlling a gain in the first BBA based on outputs from the first ADC and for controlling a gain in the second BBA based on outputs from the second ADC, said DGC block including a signal energy correction block;
   wherein said signal energy correction block is adapted to output a number of correction ticks for a numerically controlled oscillator (NCO) based on a number of gain updates performed for the first or the second BBAs.

2. The device of claim 1, wherein the DGC block includes a first clipping detector, wherein said first clipping detector is adapted to correlate in-phase input signals with a subcarrier pattern; and
   a second clipping detector, wherein said second clipping detector is adapted to correlate quadrature input signals with the subcarrier pattern.

3. The device of claim 2, wherein said subcarrier pattern is predetermined.

4. The device of claim 2, wherein the first clipping detector includes a first clipping indicator adapted to compare an input signal from the first ADC with a threshold and output a "1" if the ADC input signal is greater than the threshold, "−1" if the ADC input signal is less than the threshold and "0" otherwise.

5. The device of claim 4, wherein the first clipping detector includes a first clipping correlator adapted to correlate the output from the first clipping indicator to the subcarrier pattern and generate a first correlator output, wherein said first correlator output is provided to a finite state machine (FSM).

6. The device of claim 5, wherein said FSM is adapted to perform a linear gain update search for the first BBA based on the first correlator output, wherein said FSM detects a clipping if said first correlator output is greater than a clipping threshold.

7. The device of claim 2, wherein the second clipping detector includes a second clipping indicator adapted to compare an input signal from the second ADC with a threshold and output a "1" if the ADC input signal is greater than the threshold, "−1" if the ADC input signal is less than the threshold and "0" otherwise.

8. The device of claim 7, wherein the second clipping detector includes a second clipping correlator adapted to correlate the output from the second clipping indicator to the subcarrier pattern and generate a second correlator output, wherein said second correlator output is provided to a finite state machine (FSM).

9. The device of claim 8, wherein said FSM is adapted to perform a linear gain update search for the second BBA based on the second correlator output.

10. The device of claim 1, wherein the DGC block includes
a first water level monitor, wherein said first water level monitor is adapted to generate a first water level update based on an input signal from the first ADC, wherein said first water level update is provided to a finite state machine (FSM); and
a second water level monitor, wherein said second water level monitor is adapted to generate a second water level update based on an input signal from the second ADC; wherein said second water level update is provided to the finite state machine (FSM).

11. The device of claim 10, wherein said FSM is adapted to perform a linear gain update search for the first BBA in response to a first water level update.

12. The device of claim 10, wherein said FSM is adapted to perform a linear gain update search for the second BBA in response to a second water level update.

13. The device of claim 1, wherein said DGC includes a gain update manager for adjusting gains of the first and second BBAs.

14. The device of claim 13, wherein said gain update manager adjusting the gains of the first and second BBAs includes updating the gains for the first and second BBAs with a same value.

15. The device of claim 13, wherein said gain update manager adjusting the gains of the first and second BBAs includes updating the gains for the first and second BBAs with a different gain value for each BBA.

16. The device of claim 1, wherein the number of correction ticks at the NCO is a function of the number of gain updates performed for the first BBA during a start of frame (SOF) gain adjustment, a filter length of a subcarrier matched filter, and a filter length of a synchronizer matched filter.

17. The device of claim 1, wherein the signal energy correction block determines the number of correction ticks at the numerically controlled oscillator (NCO) according to a transfer function.

18. A device comprising:
a near field communication (NFC) module being adapted to generate an electromagnetic carrier signal and to modulate the carrier signal according to data to be transmitted;
an antenna coupled to said NFC module and driven by said NFC module with the modulated carrier signal;
an analog front end (AFE) coupled between said NFC module and said antenna circuit, said receiver analog front end including a first baseband amplifier (BBA) for amplifying in-phase signals and a second baseband amplifier (BBA) for amplifying quadrature signals;
a first analog to digital converter (ADC) coupled to said first BBA for converting in-phase signals to digital signals;
a second ADC coupled to said second BBA for converting quadrature signals to digital signals; and
a digital gain control (DGC) block for controlling a gain in the first BBA based on outputs from the first ADC and for controlling a gain in the second BBA based on outputs from the second ADC, said DGC block including:
a first clipping detector, wherein said first clipping detector is adapted to correlate in-phase input signals with a subcarrier pattern;
a second clipping detector, wherein said second clipping detector is adapted to correlate quadrature input signals with the subcarrier pattern; and
a signal energy correction block, wherein said signal energy correction block is adapted to output a number of correction ticks for a numerically controlled oscillator (NCO) based on a number of gain updates performed for the first or the second BBAs.

* * * * *